US010316980B2

(12) United States Patent
Tigwell

(10) Patent No.: US 10,316,980 B2
(45) Date of Patent: Jun. 11, 2019

(54) ASSEMBLY FOR CLOSURE OF AN OPENING INTO A CRYOGEN VESSEL

(71) Applicant: Siemens Healthcare Limited, Camberley (GB)

(72) Inventor: Neil Charles Tigwell, Witney (GB)

(73) Assignee: Siemens Healthcare Limited, Camberley (GB)

(*) Notice: Subject to any disclaimer, the term of this patent is extended or adjusted under 35 U.S.C. 154(b) by 0 days.

(21) Appl. No.: 15/683,912

(22) Filed: Aug. 23, 2017

(65) Prior Publication Data
US 2018/0058598 A1 Mar. 1, 2018

(30) Foreign Application Priority Data

Aug. 23, 2016 (GB) .................................. 1614355.4

(51) Int. Cl.
F16K 17/40 (2006.01)
F16K 17/16 (2006.01)
F16K 1/12 (2006.01)
F16K 17/164 (2006.01)
F16K 31/524 (2006.01)
F16K 17/34 (2006.01)

(52) U.S. Cl.
CPC ............ *F16K 17/1633* (2013.01); *F16K 1/12* (2013.01); *F16K 17/164* (2013.01); *F16K 17/1606* (2013.01); *F16K 17/34* (2013.01); *F16K 31/52408* (2013.01)

(58) Field of Classification Search
CPC ............ F16K 17/1633; F16K 17/1606; F16K 17/164; F16K 17/34; F16K 1/12; F16K 31/52408

USPC ... 137/68.29, 613, 68.11, 71, 463, 498, 506, 137/512.4, 527.2, 630.14; 251/73, 94
See application file for complete search history.

(56) References Cited

U.S. PATENT DOCUMENTS

| 2,048,388 | A | * | 7/1936 | Johnsen | F16L 55/1007 137/68.12 |
| 3,542,047 | A | * | 11/1970 | Nelson | F16K 17/386 137/68.12 |
| 3,590,839 | A | * | 7/1971 | Moore | F16K 17/16 123/511 |
| 3,685,536 | A | * | 8/1972 | Bake | F16K 1/12 137/338 |
| 3,693,644 | A | * | 9/1972 | Dilorenzo | F16K 17/162 137/493.2 |
| 3,913,603 | A | | 10/1975 | Torres | |
| 3,971,403 | A | * | 7/1976 | Sergent | F16K 21/18 137/459 |
| 4,566,476 | A | * | 1/1986 | Fallon | B67D 1/125 137/519 |
| 4,913,184 | A | * | 4/1990 | Fallon | F16K 17/40 137/68.19 |

(Continued)

FOREIGN PATENT DOCUMENTS

EP  1 803 991 A2  7/2007

*Primary Examiner* — Minh Le
(74) *Attorney, Agent, or Firm* — Schiff Hardin LLP

(57) ABSTRACT

An assembly for closure of an opening into a vessel, has a valve chamber, a valve biased toward a closed position in which the valve closes the first opening, and a retainer that retains the valve in an open position. A flow of cryogen from a first opening through the valve chamber to a second opening acts to displace the retainer and allow the valve to close.

8 Claims, 7 Drawing Sheets

(56) References Cited

U.S. PATENT DOCUMENTS

| | | | | |
|---|---|---|---|---|
| 5,193,569 A * | 3/1993 | Moore | ............... | B67D 7/3218 |
| | | | | 137/493.3 |
| 6,131,599 A * | 10/2000 | DeGood | ............ | F16K 17/1626 |
| | | | | 137/68.27 |
| 6,431,196 B1 * | 8/2002 | Brazier | ................. | F16K 17/16 |
| | | | | 137/15.01 |
| 7,874,309 B2 * | 1/2011 | Schaefer | ............ | F04B 27/1036 |
| | | | | 137/513.5 |
| 8,297,313 B1 * | 10/2012 | Taylor | ................. | F16K 17/406 |
| | | | | 137/613 |

* cited by examiner

ASSEMBLY FOR CLOSURE OF AN OPENING INTO A CRYOGEN VESSEL

BACKGROUND OF THE INVENTION

Field of the Invention

The present invention relates to pressure-limiting closures for cryogen vessels. In particular, the invention relates to such closures for cryogen vessels which accommodate superconducting magnets for MRI systems.

Description of the Prior Art

Typically, a cryogen vessel contains a mass of cryogen in liquid form and a further mass of cryogen in gaseous state, such that the pressure within the cryogen vessel is in excess of atmospheric pressure. It is desired, however, to limit the maximum pressure that the gaseous cryogen could reach, to limit the danger of a failure of the structure of the cryogen vessel.

Conventionally, this may be achieved by either a valve or a burst disc.

Valves have met with difficulty in that they may be unreliable in terms of long-term sealing against cryogen egress or air ingress. They have been found to provide satisfactory sealing of a cryogen vessel for a few days or weeks, but when long-term sealing is required, burst discs have been found more reliable.

Cryogen vessels must be "coded"—that is, subjected to regulatory approval. Approval may be declined in cases that the only pressure-limiting feature is a valve, at least for the above reasons.

Burst discs, on the other hand, are less likely to be blocked by an accumulation of water ice, but once they have burst, and the excess pressure within the cryogen vessel is released, they remain open and an ongoing leakage of cryogen from the cryogen vessel will occur.

The present invention accordingly provides assemblies for closure of an opening into a cryogen vessel which is eligible for regulatory approval, but which provides a reliable re-closure of the opening once a high pressure within the cryogen vessel has subsided.

SUMMARY OF THE INVENTION

In accordance with the invention an assembly for closure of an opening into a vessel, has a valve chamber, a valve biased toward a closed position in which the valve closes the first opening, and a retainer that retains the valve in an open position. A flow of cryogen from a first opening through the valve chamber to a second opening acts to displace the retainer and allow the valve to close.

DESCRIPTION OF THE PREFERRED EMBODIMENTS

The present invention provides an assembly for closure of an opening into a cryogen vessel, in which the opening is sealed by a burst disc, but the opening is closed by a valve following rupture of the burst disc by an excessive pressure within the cryogen vessel. The valve is biased toward a closed position, but is initially retained in an open position against bias means by a retainer. In case of rupture of the burst disc, the retainer is displaced by flow of cryogen from the cryogen vessel through an opening formed by rupture of the burst disc.

Figure 1:
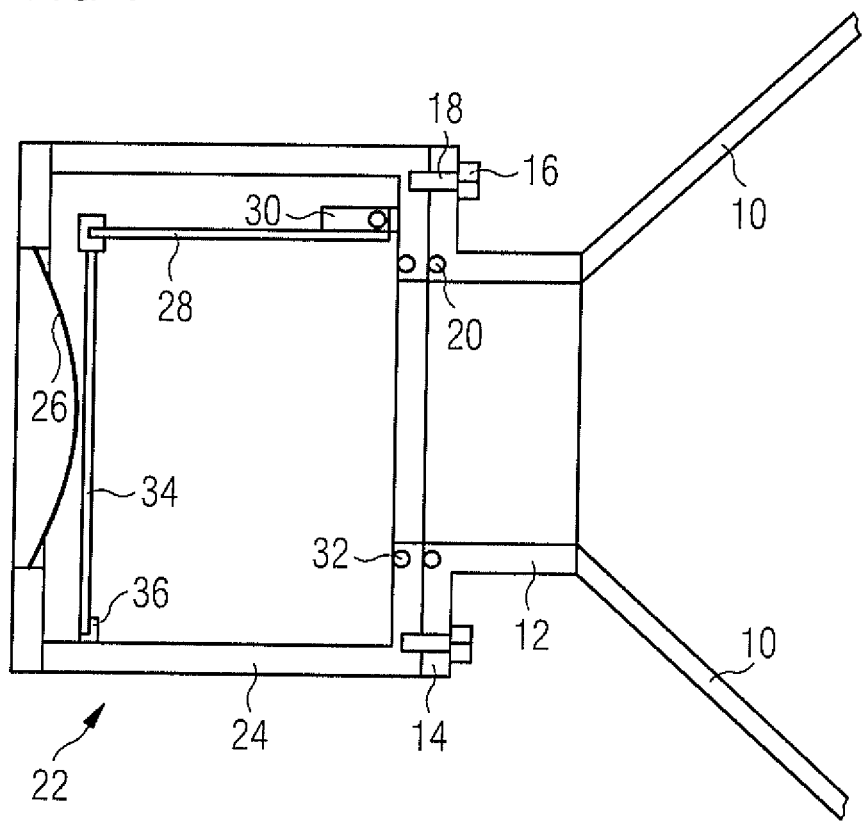
FIG. 1 shows an assembly according to a first embodiment of the present invention assembled to a cryogen vessel opening and in an initial state.
Figure 2:
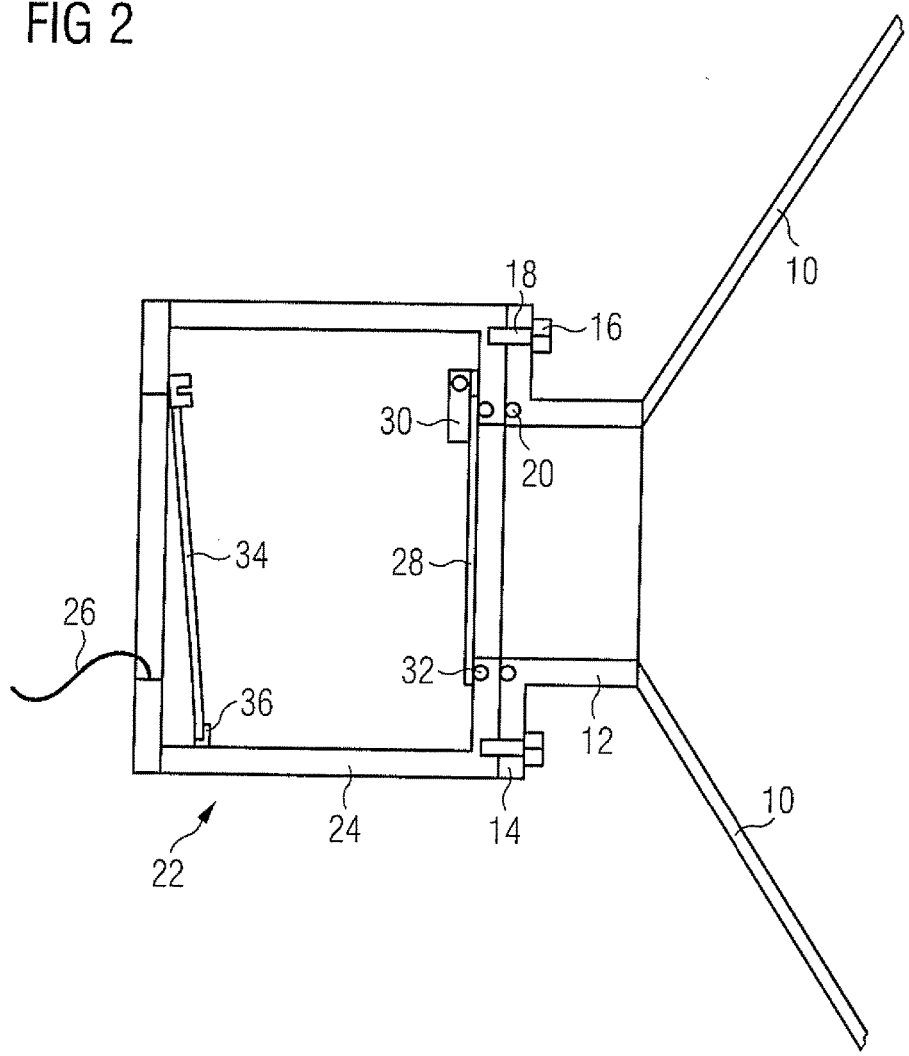
FIG. 2 shows the assembly of FIG. 1 in a second state, following an opening-and-closing sequence.
Figure 3:
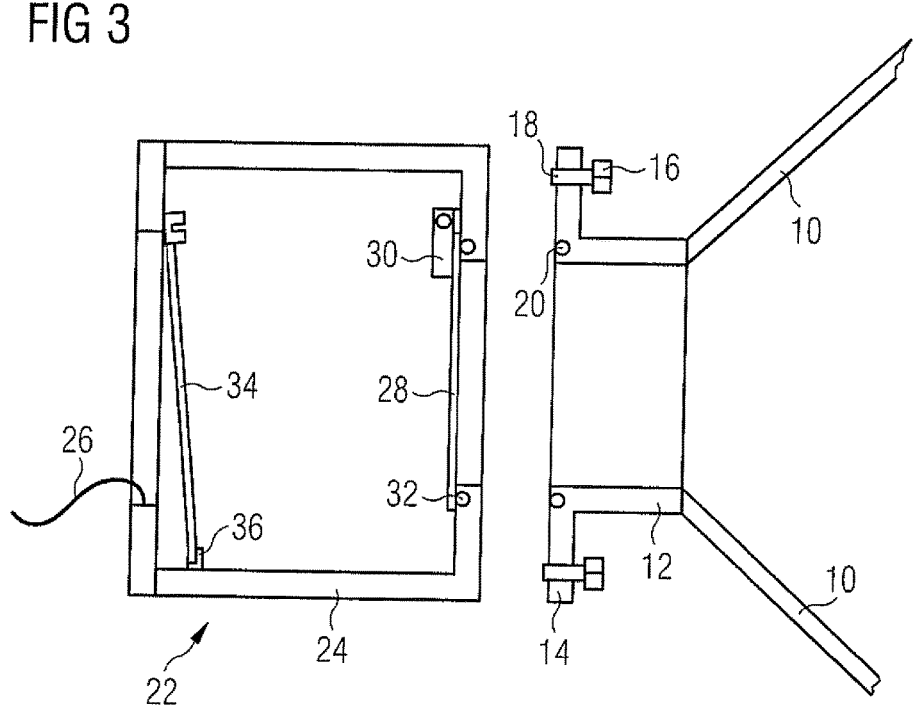
FIG. 3 shows disassembly of the assembly of FIG. 1 from the cryogen vessel opening.

FIGS. 1-3 illustrate an assembly according to a first embodiment of the present invention mounted onto a cryogen vessel. Cryogen vessel 10 is provided with an opening 12, in this case in the form of a port with a mounting flange 14. The mounting flange is provided with arrangements, here bolts 16 and through-holes 18, for mounting of accessories to the port. Resilient seal 20 is preferably also provided, mounted to the flange to ensure a leak-tight seal between the cryogen vessel and a mounted accessory. In FIG. 1, the mounted accessory is an assembly 22 according to a first embodiment of the present invention, in a first, unopened state.

Assembly 22 includes a valve chamber 24, open to the interior of cryogen vessel 10 on one side, and closed by a burst disc 26 on another side, preferably a side opposite the opening to the cryogen vessel. The valve chamber 24 is otherwise closed, and provides a cryogen-tight seal to the opening into the cryogen vessel 10.

In the embodiment of FIG. 1, valve chamber 24 encloses a flap valve, itself comprising a sprung hinge 30 carrying a valve flap 28 and a resilient seal 32 attached to an interior surface of the valve chamber to provide a seat for the valve flap 28 when in its closed position. Sprung hinge 30 is spring biased toward a closed position of the valve flap. The valve flap 28 is held in an open position by suitable retainer such as a support strut 34, against the force of the spring biased hinge 30. In the embodiment of FIG. 1, valve chamber 24 encloses a flap valve, itself including a sprung hinge 30 carrying a valve flap 28 and a resilient seal 32 attached to an interior surface of the valve chamber to provide a seat for the valve flap 28 when in its closed position. The valve flap 28 is held in an open position by suitable structure, such as a support strut 34. Sprung hinge 30 is spring biased toward a closed position of the valve flap. In alternative embodiments, the hinge is not sprung, but the valve flap 28 is weighted such that the required bias is provided by gravity.

Support strut 34 is mounted to an interior surface of the valve chamber 24. This may be by way of a hinge 36, or a flexible support strut 34 may be bonded to an interior surface of the valve chamber 24. In the first, unopened, state illustrated in FIG. 1, support strut 34 is retained in position between valve flap 28 and burst disc 26. The interior of valve chamber 24 is open to the interior of cryogen vessel 10, and the valve chamber 24 is sealed to the exterior by burst disc 26.

For a reason unconnected with the present invention such as the occurrence of a quench of a superconducting magnet located within the cryogen vessel, the pressure of cryogen within the cryogen vessel may rise toward an unacceptable level. In such a circumstance, the burst disc 26 will rupture, thereby preventing the pressure within the cryogen vessel from reaching an unacceptable level. Once the burst disc 26 ruptures, cryogen gas will flow from cryogen vessel 10 through an opening created by the rupture of the burst disc. The flow of cryogen gas exerts a force on support strut 34 sufficient to deflect it away from valve flap 28 such that valve flap is no longer retained in position by support strut 34. The valve flap 28 may be held open by the flow of cryogen, but tends to close onto valve seat provided by seal 32, under bias from the spring biased hinge 30.

The support strut 34 may be specially shaped to ensure that it impedes flow of cryogen gas to an extent sufficient to ensure that it is deflected away from valve flap 28, for example by presenting a significant surface area to the flow of cryogen. The support strut 34 may be provided with one or more "sails", which increase the surface area of the support strut in the direction of flow of cryogen gas, thereby to increase the impedance to the flow of cryogen gas by the support strut 34. Such sails may be arranged to detach, disintegrate or deflect out of the path of cryogen once the support strut 34 has deflected away from valve flap 28. Additionally, or alternatively, the support strut may be biased toward the burst disc, by a spring biased hinge 36 and/or by spring tension within the material of the support strut. The flow of cryogen from cryogen vessel 10 may keep valve flap 28 open, by acting on the valve flap against the spring bias provided by hinge 30.

Spring-biased hinge 30 may be provided by spring tension in the material of a valve flap mounted directly to the interior of the valve chamber 24.

Once flow of cryogen from the cryogen vessel 10 has subsided, the spring bias of hinge 30 causes valve flap 28 to close against resilient seal 32, into a second state.

In the arrangement illustrated in FIG. 1, and preferably, it is impossible for the support strut 34 to disengage from the valve flap 28 and allow the valve flap 28 to close while the burst disc 26 remains intact. This ensures that accidental disengagement of the retainer, here embodied as support strut 34, is not possible. The presence of an intact burst disc 26 thereby ensures that the valve flap 28 stays open and provides a relatively unimpeded path for flow of cryogen through the valve chamber 24 until after the flow of cryogen has subsided.

FIG. 2 shows the assembly of FIG. 1 in the second state, following an opening-and-closing sequence described above, in which burst disc 26 has ruptured, opening an egress path from the cryogen vessel 10. Cryogen gas has escaped through an opening created by the rupture of the burst disc 26. The flow of cryogen has disengaged support strut 34 from valve flap 28 and the flap valve has closed by influence of spring-loaded hinge 30 on to valve flap 28. In alternative embodiments, the hinge is not sprung, but the valve flap 28 is weighted such that the required bias is provided by gravity. Support strut 34 is illustrated intact, although in some embodiments, the support strut 34 may be designed to fracture or otherwise be removed from the cryogen egress path by or in response to a flow of cryogen through the valve chamber 24. The support strut 34 could simply come to rest in a recess in an inner surface of the valve chamber 24. Closure of the flap valve will, to a significant extent, impede further egress of cryogen gas from, and ingress of air into, the cryogen vessel 10. The spring biased hinge 30 should be designed such that valve flap 28 closes while the cryogen vessel still contains a pressure in excess of atmospheric pressure, such that a small degree of leakage at the valve seat 32 will not result in air ingress to the cryogen vessel, or a significant loss of cryogen. Should a cryogen pressure within cryogen vessel 10 become elevated once more, the pressure will act on valve plate 44 and cause it to open should the cryogen pressure exceed a level determined by the tension in the sprung hinge 30.

It is believed that a cryogen vessel containing a superconducting magnet for an MRI imaging system could be left sealed by the assembly of the present invention, as illustrated in FIG. 2, for several weeks: which should enough of time to arrange a service visit for replacement of the burst disc 26 before the cryogen reaches a level low enough to risk warming of the superconducting magnet. This assumes that the MRI system is not operated during this time. Commonly, a cryogenic refrigerator is prevented from operating if the cryogen gas pressure within an associated cryogen vessel falls below a certain pressure above atmospheric pressure, such as 0.2 psi. The tension on bias spring 30 should accordingly be selected to maintain a pressure of at least 0.2 psi above atmospheric within the cryogen vessel.

FIG. 3 illustrates a step in a maintenance procedure. Following rupture of the burst disc 26 as described above, assembly 22 may be removed in its entirety and replaced with a new equivalent assembly. The removed assembly 22 may be repaired, by replacement of burst disc 26 and rearrangement of support strut 34 and valve flap 28. Alternatively, practicalities and economics may lead to the assembly 22 being treated as a disposable part.

Figure 4:
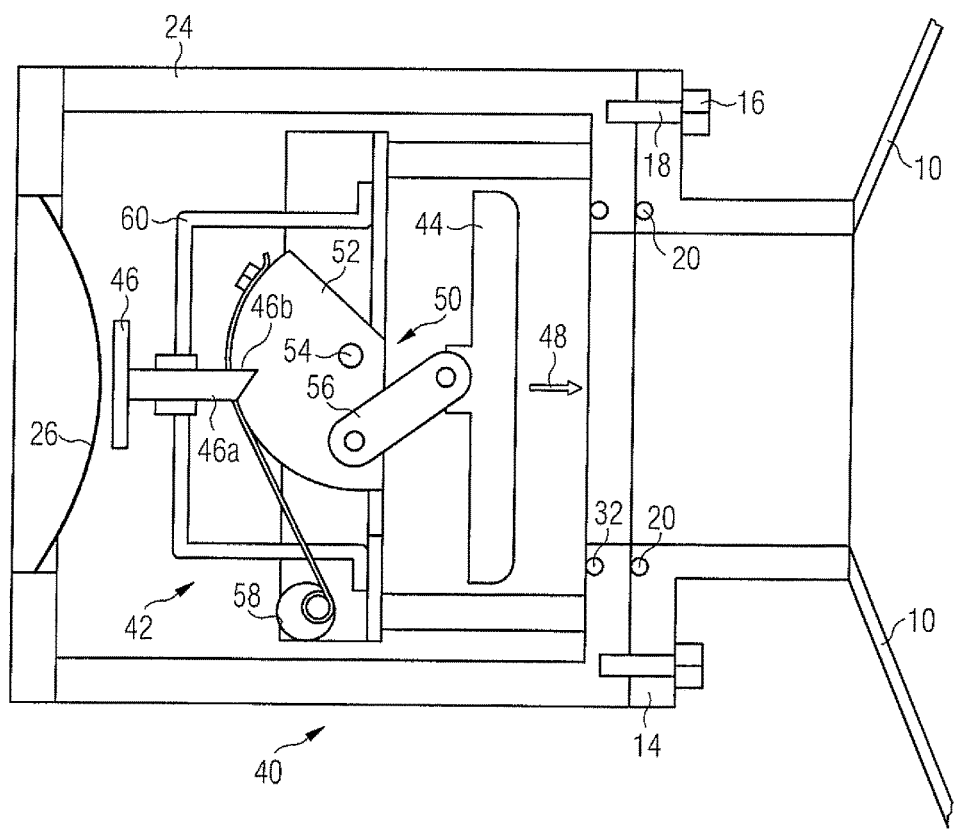
FIG. 4 shows an assembly according to a second embodiment of the present invention assembled to a cryogen vessel opening and in an initial state.

FIG. 4 illustrates an alternative, second, embodiment of the present invention. Features in common with the arrangement of FIGS. 1-3 carry corresponding reference numerals.

Assembly 40 includes a valve chamber 24, sealed at one side with a burst disc 26, and open at another side, preferably the side opposite the burst disc, to join to a flange 14 of an opening into cryogen vessel 10. A valve assembly 42 is enclosed within the valve chamber 24. A valve plate 44 is held in position away from a valve seat provided by a resilient seal 32 mounted to the interior of valve chamber 24, by a retainer that includes an actuator 46. Valve assembly 42 includes a valve plate 44 which is moveable linearly in the direction of arrow 48 when actuated by rotary mechanism 50. Valve assembly 42 also includes a cam 52 mounted at a pivot 54 and linked to valve plate 44 by link 56. Cam 52 is attached to a spring 28, which may be a constant tension spring which biases the cam, and thereby the link 56 and valve plate 44 toward a closed position of valve assembly 42. Actuator 46 includes a locking pin 46a, which is restrained in position in a notch 46b in cam 52 by friction on a flat face of the locking pin 46a from an interfering surface of the cam under spring tension from constant tension spring 58. Valve assembly 42 is prevented from moving toward its closed position by the actuator 46, which interacts with the cam 52 to prevent the cam 52 from rotating under the influence of a constant tension spring 58. A mechanical mounting frame 60 is provided for mounting and retaining the various components of the valve assembly 42.

As discussed above with reference to FIG. 1, burst disc 26 seals the valve chamber 24 and prevents egress of cryogen from cryogen vessel 10. In case of excessive cryogen pressure arising within the cryogen vessel for any reason, burst disc 26 will rupture, opening an egress path from cryogen vessel 10 to allow escape of cryogen, thereby limiting the pressure within cryogen vessel 10. The flow of cryogen past valve plate 44 exerts a force on the plate in excess of the opposing force exerted by the constant tension spring 58. This causes the valve plate to move in the direction of cryogen flow, in turn causing the cam 52 to rotate slightly, lifting the interfering surface from the locking pin 46a. The flow of cryogen through the opening left by the ruptured burst disc catches on actuator 46 of the retainer and displaces the actuator away in the direction of the flow of cryogen. Additionally, or alternatively, the rotation of cam 52 caused by the pressure of cryogen flow on the valve plate may act to displace locking pin 46a from notch 46b, particularly in the case where the pin has a suitably tapered end, such as shown in FIG. 4.

The presence of burst disc 26 and friction between the locking pin 46a and an interfering surface of the cam prevents the locking pin 46a from disengaging from notch 46b at times other than in case of rupture of the burst disc. In the arrangement illustrated in FIG. 4, and preferably, it is impossible for the locking pin 46a to disengage from the notch 46b in cam 52 and allow the valve plate 44 to close while the burst disc 26 remains intact, due to the dimension and positioning of actuator 46 as a whole. This ensures that accidental disengagement of the retainer, here embodied as locking pin 46a and notch 46b in cam 52, is not possible. The presence of an intact burst disc 26 thereby ensures that the valve plate 44 stays open and provides a relatively unimpeded path for flow of cryogen through the valve chamber 24 until after the flow of cryogen has subsided.

Rupture of the burst disc 26 allows a flow of cryogen through the valve chamber 24, past actuator 46. Rupture of the burst disc 26 also enables actuator to move in the direction of cryogen flow. Impedance of the cryogen flow by the actuator 46 causes the actuator 46 to move in the direction of cryogen egress. Once the actuator 46 has moved, cam 52 rotates under bias of the constant tension spring 58, driving link 56 which in turn drives valve plate 44 into contact with the valve seat provided by resilient seal 32, as described above with reference to FIG. 2. Flow of cryogen from cryogen vessel 10 through the valve chamber may keep valve plate 44 open until the cryogen flow has subsided.

Figure 5:
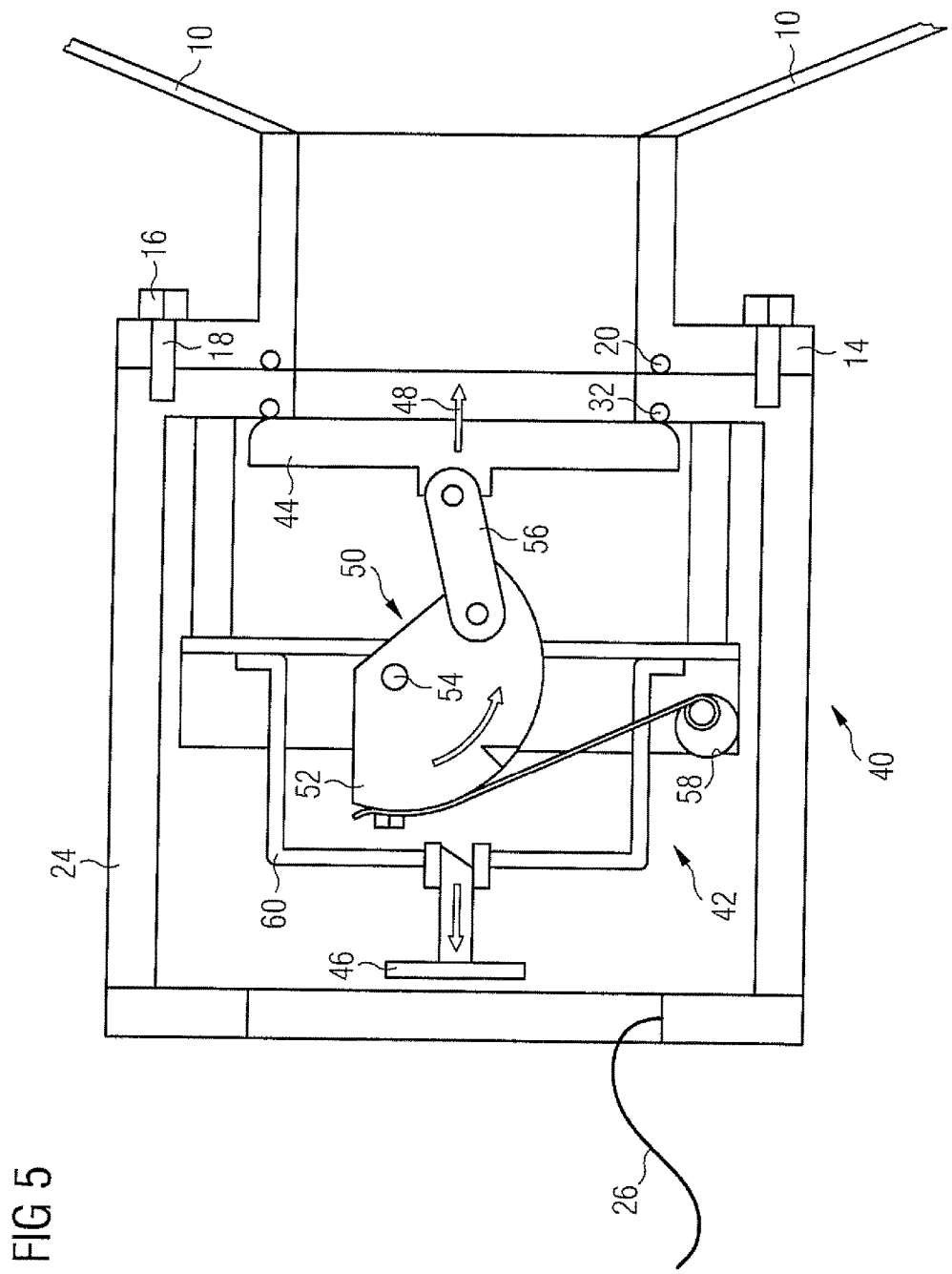
FIG. 5 shows the assembly of FIG. 4 in a second state, following an opening-and-closing sequence.

FIG. 5 illustrates the embodiment of FIG. 4 in the second state, following an opening-and-closing sequence described above, in which burst disc 26 has ruptured, opening an egress path from the cryogen vessel 10, cryogen gas has escaped through an opening created by the rupture of the burst disc 26 and the valve assembly 42 has closed by influence of constant tension spring 58 on cam 52 once actuator 46 has moved in the direction of cryogen flow by action of the cryogen flow on the actuator 46. Should a cryogen pressure within cryogen vessel 10 become elevated, the pressure will act on valve plate 44 and cause it to open should the cryogen pressure exceed a level determined by the tension in the constant tension spring 58.

In alternative arrangements, cam 50 may act directly upon valve plate 44.

Commonly, a cryogenic refrigerator is prevented from operating if the cryogen gas pressure within an associated cryogen vessel falls below a certain pressure above atmospheric pressure, such as 0.2 psi. The tension on spring 58 30 should accordingly be selected to maintain a pressure of at least 0.2 psi above atmospheric within the cryogen vessel.

Figure 6:
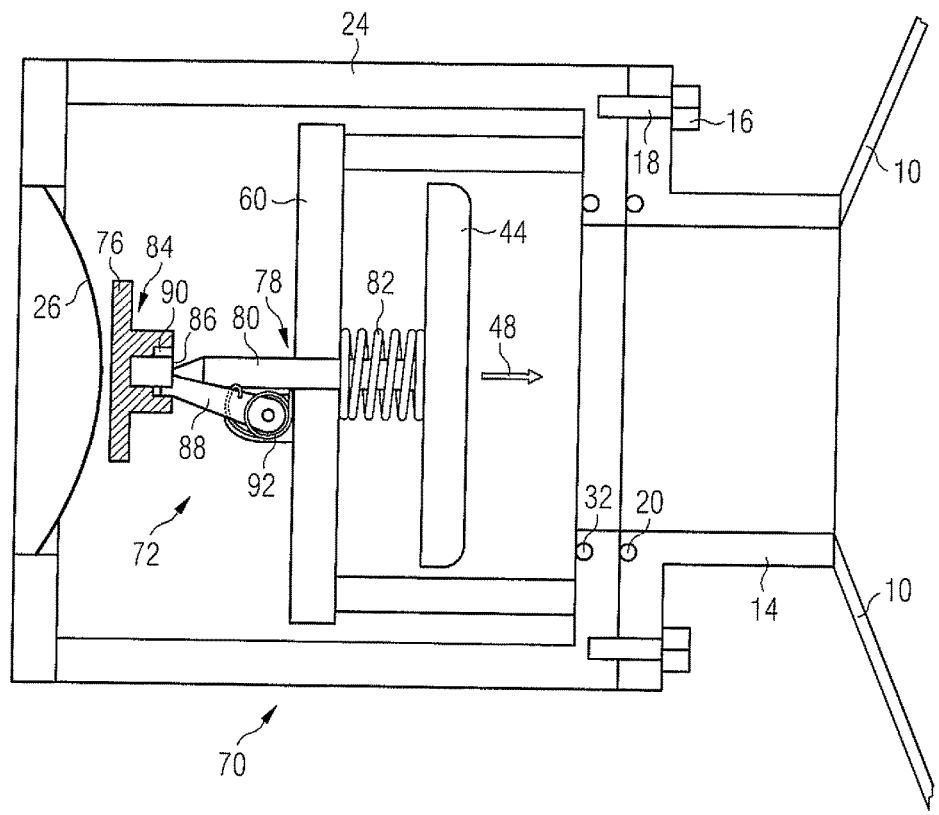
FIG. 6 shows an assembly according to a third embodiment of the present invention assembled to a cryogen vessel opening and in an initial state.

FIG. 6 illustrates an alternative, third, embodiment of the present invention. Features in common with the arrangements of FIGS. 1-5 carry corresponding reference numerals.

Assembly 70 includes a valve chamber 24, sealed at one side with a burst disc 26, and open at another side, preferably the side opposite the burst disc, to join to a flange 14 of an opening into cryogen vessel 10. A valve assembly 72 is enclosed within the valve chamber 24. A valve plate 44 is held in position away from a valve seat provided by a resilient seal 32 mounted to the interior of valve chamber 24, by a retainer 84. Valve assembly 72 includes a valve plate 44, which is moveable linearly in the direction of arrow 48 when actuated by linear drive mechanism 78. Valve assembly 72 also includes a valve plate 44, mounted on a shaft 80 which is biased by a spring 82 such that the valve plate 44 tends to move toward the valve seat provided by the resilient seal 32 mounted on an interior surface of the valve chamber 24. The valve assembly 72 is retained in an open position by a retainer 84 which will now be described.

Shaft 80 is provided with a recess 86 which interacts with a suitably-shaped detent 88. Actuator 76 is provided with a recess 90 which accommodates parts of the shaft 80 and of the detent 88. The detent is biased by a spring 92 away from the shaft, but is retained by recess 90 of actuator 76 in abutment with the recess 86 in the shaft 80. Valve plate 44 is retained in an open position by the action of detent 88 on the recess 86 of shaft 80. A mechanical mounting frame 60 is provided for mounting and retaining the various components of the valve assembly 42.

As discussed above with reference to FIG. 1, burst disc 26 seals the valve chamber 24 and prevents egress of cryogen from cryogen vessel 10. In case of excessive cryogen pressure arising within the cryogen vessel for any reason, burst disc 26 will rupture, opening an egress path from cryogen vessel 10 to allow escape of cryogen, thereby limiting the pressure within cryogen vessel 10.

Rupture of the burst disc 26 allows actuator 76 to move in the direction of cryogen egress. Indeed, the egress flow of cryogen through the opening formed by rupture of the burst disc exerts a force on the actuator 76 and releases detent 88 and shaft 80 from recess 90. Once the actuator 76 has moved, detent 88 is released from recess 86 and moves under bias of spring 92 away from shaft 80. Shaft 80 is then free to move under bias of the spring 82 in the direction of arrow 48 until valve plate 44 rests on the valve seat formed by resilient seal 32 on the inner surface of valve chamber 24. During egress of cryogen through the opening formed by rupture of the burst disc, valve plate 44 may be forced in the direction of cryogen flow by the flow of cryogen itself. The optional illustrated tapering of the recess 86 in the shaft 80 will assist in displacing the detent 88 from the recess 86. Indeed, such action may be sufficient in itself to ensure disengagement of the detent, such that bias spring 92 is unnecessary. Alternatively, the illustrated tapering may be omitted, and the bias spring 92 relied on alone to ensure disengagement of the detent 88.

The valve plate 44 will come to rest on its valve seat only when the pressure of cryogen within cryogen vessel 10 reduces such that the force applied by spring 82 is great enough to overcome the force applied to the valve plate 44 by cryogen pressure. The force applied by spring 82 should be sufficient to maintain a slight pressure within the cryogen vessel in excess of atmospheric pressure.

In the arrangement illustrated in FIG. 6, and preferably, it is impossible for the detent 33 to disengage from the recess 86 in shaft 80 and allow the valve plate 44 to close while the burst disc 26 remains intact, due to the dimension and positioning of actuator 76 as a whole. This ensures that accidental disengagement of the retainer, here embodied as detent 33, recess 86, and actuator 76 is not possible. The presence of an intact burst disc 26 thereby ensures that the valve plate 44 stays open and provides a relatively unimpeded path for flow of cryogen through the valve chamber 24 until after the flow of cryogen has subsided.

Figure 7:
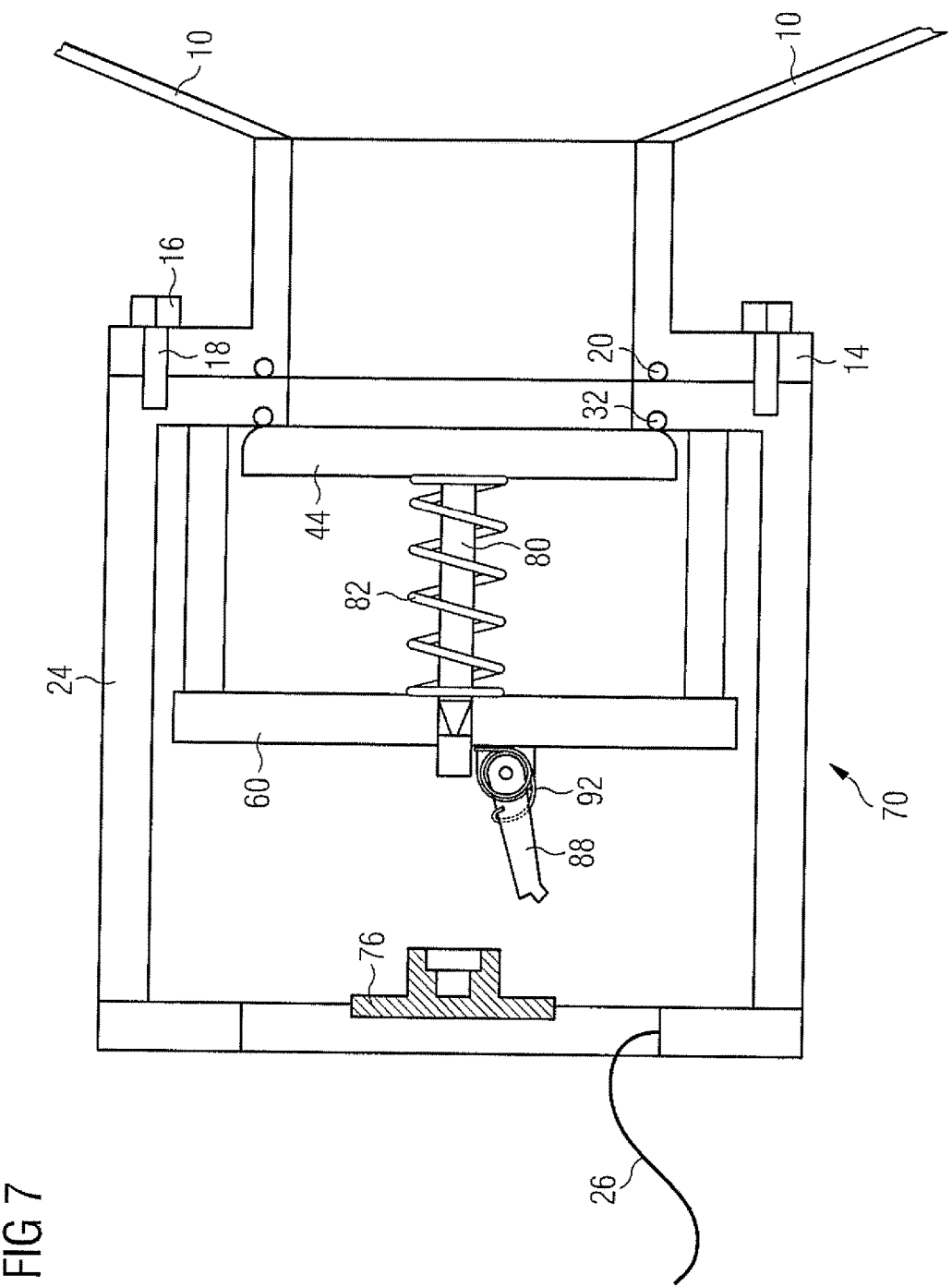
FIG. 7 shows the assembly of FIG. 6 in a second state, following an opening-and-closing sequence.

FIG. 7 illustrates the embodiment of FIG. 6 in the second state, following an opening-and-closing sequence described above, in which burst disc 26 has ruptured, opening an egress path from the cryogen vessel 10, cryogen gas has escaped through an opening created by the rupture of the burst disc 26 and the valve assembly 72 has closed by influence of bias spring 82 on valve plate 44. Should a cryogen pressure within cryogen vessel 10 become elevated once more, the pressure will act on valve plate 44 and cause it to open should the cryogen pressure exceed a level determined by the force applied by bias spring 82.

Commonly, a cryogenic refrigerator is prevented from operating if the cryogen gas pressure within an associated cryogen vessel falls below a certain pressure above atmospheric pressure, such as 0.2 psi. The tension on spring 82 should accordingly be selected to maintain a pressure of at least 0.2 psi above atmospheric within the cryogen vessel.

In each embodiment, the valve plate need not seal completely, but should seal sufficiently so that a differential pressure of 0.2-1.0 psi can be maintained across the valve plate, to thereby retain a positive pressure within the cryogen vessel 10. This enables a cryogenic refrigerator to continue to operate, to maintain the cryogen vessel at a low temperature and reduce further loss of cryogen by boiling. Typically, cryogen refrigerators are switched off when the pressure within the cryogen vessel falls below 0.2 psi above atmospheric, to prevent ingress of air into the cryogen vessel.

In the illustrated embodiments, concave metal reverse acting burst discs 26 are illustrated. The present invention may equally be applied to flat graphite burst discs, conventional in themselves.

Preferably, the retainer is arranged, by design and position relative to an intact burst disc 26, to prevent disengagement of the retainer while the burst disc 26 remains intact.

The present invention accordingly provides an assembly for closure of an opening into a vessel, in which the opening is sealed by a burst disc, but the opening is closed by a valve following rupture of the burst disc by an excessive pressure within the vessel. Numerous variations will be apparent to those skilled in the art, without diverting from the scope of the present invention.

While the present invention has been described with particular reference to cryogen vessels, the invention may be applied to other vessels, where a maximum pressure may be enforced by use of a burst disc, but where air ingress, and continued loss of the content of the vessel, is to be avoided. Such applications may include vessel in the oil and gas industry, and fuel tanks, for example in the automotive industry.

The invention claimed is:

1. An assembly for closure of an opening into a vessel said assembly comprising:
   a valve chamber, having a first opening on one side, and having a second opening, closed by a burst disc, on another side, the valve chamber being otherwise closed and suitable to provide a cryogen-tight seal when mounted to the opening into the vessel;
   a valve comprising a valve flap and a valve seat, said valve flap being biased toward a closed position on said valve seat in which the valve closes the first opening; and
   a retainer that retains the valve in an open position, with flow of gas from the first opening through the valve chamber to the second opening acting to displace the retainer and allow the valve to close, the retainer comprising a support strut which, in a first position, engages with the valve flap to retain the valve in an open position, and in a second position does not engage with the valve flap, thereby allowing the valve flap to close onto the valve seat.

2. An assembly according to claim 1, wherein the support strut comprises a sail, which increases impedance of the support strut to a flow of cryogen gas from the first opening to the second opening.

3. An assembly according to claim 2, wherein the sail is configured to detach, disintegrate or deflect out of the path of cryogen once the support strut has reached its second position.

4. An assembly according to claim 1 wherein the retainer is configured to prevent disengagement of the retainer while the burst disc remains intact.

5. An assembly according to claim 4 wherein the retainer is designed, and positioned relative to an intact burst disc, to prevent disengagement of the retainer while the burst disc remains intact.

6. An assembly for closure of an opening into a vessel, said assembly comprising:
   a valve chamber, having a first opening on one side, and having a second opening, closed by a burst disc, on another side, the valve chamber being otherwise closed and suitable to provide a cryogen-tight seal when mounted to the opening into the vessel;
   a valve, biased toward a closed position in which the valve closes the first opening, the valve comprising a valve plate operable by a cam under the influence of a spring; and
   a retainer that retains the valve in an open position, with flow of gas from the first opening through the valve chamber to the second opening acting to displace the retainer and allow the valve to close, the retainer comprising a retaining pin, which interferes with cam to prevent closure of the valve, said retainer being displaced out of interference with the cam by a flow of cryogen from the first opening to the second opening.

7. An assembly according to claim 6 wherein the valve plate is operable by the cam by means of a link.

8. An assembly for closure of an opening into a vessel, said assembly comprising:
   a valve chamber, having a first opening on one side, and having a second opening, closed by a burst disc, on another side, the valve chamber being otherwise closed and suitable to provide a cryogen-tight seal when mounted to the opening into the vessel;
   a valve, biased toward a closed position in which the valve closes the first opening, the valve comprising a valve plate operable by a linear drive mechanism comprising a shaft and a spring that biases the valve plate toward a closed position; and
   a retainer that retains the valve in an open position, with flow of gas from the first opening through the valve chamber to the second opening acting to displace the retainer and allow the valve to close, the retainer comprising a detent abutting a recess in the shaft, and an actuator comprising a recess that retains the detent in position, said actuator being arranged to be displaced away from the detent by a flow of cryogen from the first opening to the second opening.

* * * * *